(12) United States Patent
Hung (10) Patent No.: US 7,464,289 B2
(45) Date of Patent: Dec. 9, 2008

(54) STORAGE SYSTEM AND METHOD FOR HANDLING BAD STORAGE DEVICE DATA THEREFOR

(75) Inventor: Ching-Hai Hung, Yonghe (TW)

(73) Assignee: Infortrend Technology, Inc., Taipei Hsien (TW)

( * ) Notice: Subject to any disclaimer, the term of this patent is extended or adjusted under 35 U.S.C. 154(b) by 547 days.

(21) Appl. No.: 11/296,453

(22) Filed: Dec. 8, 2005

(65) Prior Publication Data

US 2006/0149999 A1   Jul. 6, 2006

Related U.S. Application Data

(60) Provisional application No. 60/593,104, filed on Dec. 10, 2004.

(51) Int. Cl.
*G06F 11/00* (2006.01)
(52) U.S. Cl. ......................................................... 714/7
(58) Field of Classification Search ........................ None
See application file for complete search history.

(56) References Cited

U.S. PATENT DOCUMENTS

| | | | | |
|---|---|---|---|---|
| 5,390,327 | A * | 2/1995 | Lubbers et al. | 714/7 |
| 5,913,927 | A | 6/1999 | Nagaraj et al. | |
| 6,243,827 | B1 * | 6/2001 | Renner, Jr. | 714/6 |
| 6,851,082 | B1 * | 2/2005 | Corbett | 714/770 |
| 6,944,791 | B2 * | 9/2005 | Humlicek et al. | 714/6 |
| 6,959,413 | B2 * | 10/2005 | Humlicek et al. | 714/807 |
| 7,185,222 | B2 * | 2/2007 | Burton et al. | 714/5 |
| 7,275,179 | B1 * | 9/2007 | Coatney | 714/7 |
| 2006/0212748 | A1 * | 9/2006 | Mochizuki et al. | 714/6 |
| 2006/0248378 | A1 * | 11/2006 | Grcanac et al. | 714/6 |

* cited by examiner

*Primary Examiner*—Michael C Maskulinski
*Assistant Examiner*—Neil D Miles
(74) *Attorney, Agent, or Firm*—Rosenberg, Klein & Lee (57) ABSTRACT

A storage system and method for handling bad storage device data therefor are described. The present invention uses a first mark and/or a second mark for the data processing of the redundant storage devices when the storage system is in the degraded mode together with a media error occurred or when in data writing, there is a reading abnormality in the storage devices so that new check data cannot be generated; and therefore, a better data protection method is provided.

20 Claims, 10 Drawing Sheets

STORAGE SYSTEM AND METHOD FOR HANDLING BAD STORAGE DEVICE DATA THEREFOR

CROSS-REFERENCE TO RELATED APPLICATION

This application claims the priority benefit of U.S. Provisional Application Ser. No. 60/593,104, filed Dec. 10, 2004, the full disclosures of which are incorporated herein by reference.

BACKGROUND OF THE INVENTION

1. Field of Invention

The present invention relates to a redundant array of inexpensive/independent disks (RAID) storage system and, in particular, to a method for handling bad storage device data in a storage system.

2. Related Art

High capacity, high speed, and high availability are the main reasons the RAID (redundant array of inexpensive/independent disks) systems become so popular. Generally speaking, the RAID systems include several levels, such as N-RAID (non-RAID or it is also called disk spanning), RAID 0 (disk striping), RAID 1, RAID 2, RAID 3, RAID 4, RAID 5, and RAID 6 and also variable combinations among them. The main character of the RAID 1 is mirroring. The data are backed-up by mirroring. The backup data are usually called the check data. The check data of RAID 3 through RAID 5 are parity data generated by XOR operation for maintaining the data consistency, thereby ensuring the data integrity even when a disk drive has an error. RAID 6 requires more check data in order to ensure the data integrity even when more disk drives all have an error.

Figure 1:
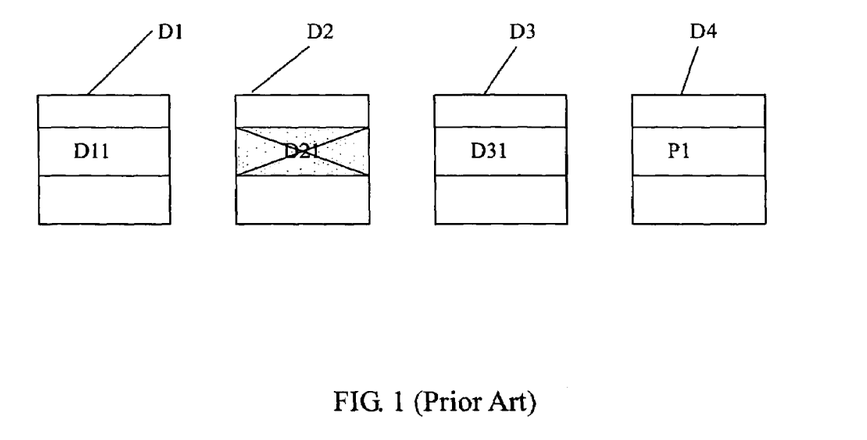
FIG. 1 is a schematic view of a conventional RAID system.

FIG. 1 is a schematic view of a conventional RAID system. For example, it is a RAID 4 system comprising several disk drives D1, D2, D3, D4. These disk drives are called the member disk drives of the RAID system or the related disk drives, and they are redundant disk drives of each other. They are divided into a plurality of stripes and each stripe comprises a plurality of chunks each belonging to a member disk drive. A chunk comprises a plurality of sector. In member disk drives, the user data and the check data located in the same stripe are redundant data of each other, or we are called related data. Under normal situation, if the data D21 of the disk drive D2 have an error, then the same data can be generated through reading the related data D11, D31, and P1 on the same stripe of the data D21 and performing an XOR operation on them. That is, $D21=P1 \oplus D11 \oplus D31$. Of course, if the entire disk drive D2 fails, the above-mentioned XOR operation can be used to rebuild the data of the entire disk drive D2.

However, while one of the disk drives D1, D2, D3, D4 is being rebuilt due to failure of it, if another data reading error occurs, the rebuilding could be unable to complete.

Figure 2:
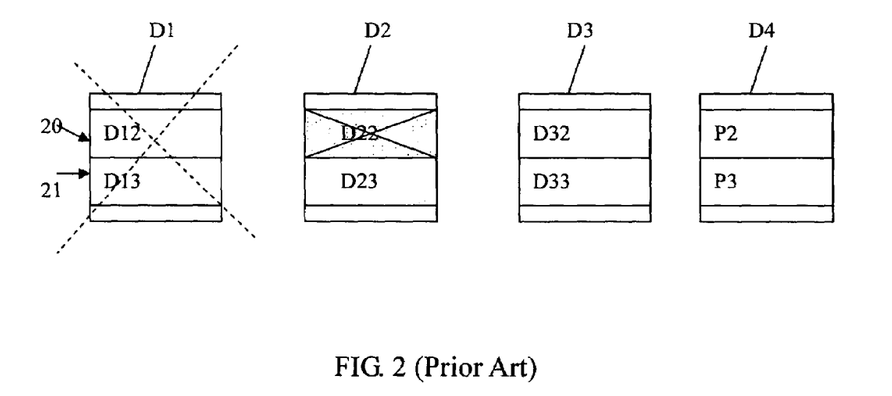
FIG. 2 is a schematic view of data rebuilding in the degraded mode in the prior art.

FIG. 2 is a schematic view of data rebuilding in the degraded mode in the prior art. There are several disk drives D1, D2, D3, and D4. The data D12, D22, D32 and the parity data P2 are located on the same stripe 20. The data D13, D23, D33, and the parity data P3 are located on the same stripe 21. Suppose the disk drive D1 is being rebuilt due to failure of it. To rebuild the data D12, the data D22, D32 and the parity data P2 on the same stripe 20 are read. If D22 can not be read due to a media error, then it is impossible to rebuild the data D21.

Besides, the conventional system may keep trying to read the data D22 so that the data building for the disk drive D1 can not proceed smoothly.

However, reconstructing of the data D12 by skipping and ignoring the block to continue the reconstructing by using the other blocks will result in incorrect data D12. When a requesting application-end accesses the data D12 in the future, although the block of data D12 are readable, they are incorrect. Since the requesting application-end does not know that they are incorrect, the requesting application-end will use the incorrect data.

Figure 3:
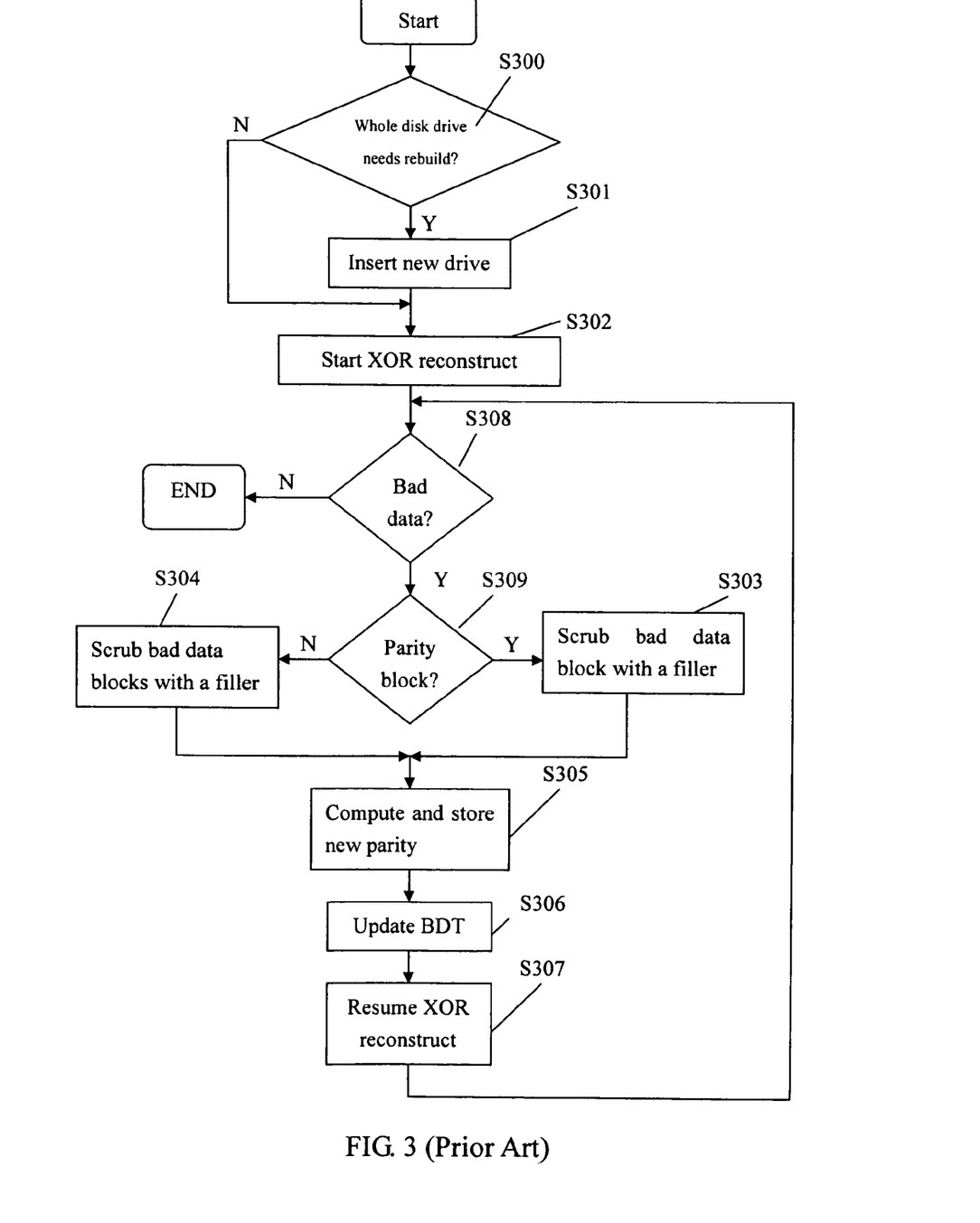
FIG. 3 is a flowchart of data management in the degraded mode in the prior art.

FIG. 3 shows the flowchart of how U.S. Pat. No. 5,913,927 (hereinafter abbreviated as '927) solves the above-mentioned problem. It is a process performed during rebuilding or reconstructing the data. At first, it is determined whether an entire disk drive has to be rebuilt (step S300). If the entire disk drive has to be rebuilt, then a new disk drive is inserted (step S301). Then, starting parity rebuilding to rebuild the damaged disk data, that is, the related data in the other disk drives are retrieved and XOR operations are performed to rebuild the data (step S302). If there is no need to rebuild the disk drive and only need reconstruction of specific data, then step S302 is directly performed.

Before performing the XOR operation, the related data in the other disk drives have to be read first and are checked to determine whether there are bad data (step S308). If there are no bad data in the read data, then the above-mentioned XOR operation is performed to complete the data reconstructing. If there are bad data in the read data, then they are checked to determine if the bad data are located in the parity block (step S309). If the bad data are located in the parity block, then it means that the bad data are parity data but they are bad. At this time, a filler of specific values is filled into the block to be rebuilt, so that the data to be rebuilt becomes the specific values, which, however, are not equal to the original data. That is, the reconstructed data filled with the specific value are invalid compared to the undamaged data (original data) (step S303). Afterwards, the block of reconstructed data filled with the specific values and the related data on the stripe where the reconstructed data belong are re-performed with the XOR operation to obtain new parity data. The new parity data are then used to update the parity data block (step S305).

If the read data are bad and the bad data are not in the parity block, then the filler of specific values is used to fill the data block to be rebuilt and the read bad data block, so that the data become the specific values, which, however, are not equal to the original data. That is, the data are invalid compared to the undamaged data (original data) (step S304). Afterwards, step S305 is performed to re-do the XOR operation. The parity data thus obtained are used to update the parity data block.

Since the above-mentioned data block filled with the specific values have incorrect values, the '927 patent records the address of the data block filled with the specific values in a bad data table (BDT) to avoid reading incorrect data by the host in the future. After the XOR operation is finished, the BDT is also updated (step S306). Finally, the reconstruction of a next data block is continued until the rebuilding action is complete (step S307). Therefore, when the host accesses the data block filled with the specific values, an error message will appear. The record in the BDT will not be deleted until the host uses new data to overwrite the data block filled with the specific values.

However, the above-mentioned method does not provide a good reliability for data protection. For example, if media error occurs to the read data while the data are being rebuilt, then a filler is immediately filled into the read data block. However, the media error may be temporary, caused by unstable voltage, over-heating, and system instability, etc. The data may have chance to be successfully read next time, although it is not readable temporarily. Therefore, filling the data block with the filler immediately will result in permanent loss of the data and make the system reliability not well.

SUMMARY OF THE INVENTION

An objective of the present invention is to provide a storage system and a method for handling bad storage device data therefor in order to provide better data protection.

Another objective of the present invention is to provide a storage system and a method for handling bad storage device data therefor so that the system overall reliability can be improved.

According to a feature of the present invention, a disclosed method for handling bad storage device data is used in a storage system of a degraded mode. Under the degraded mode, target data need to be reconstructed. The method comprises the following steps: a step of reading related data wherein at least one data that are related to the target data are read; a marking step, wherein if there is a reading error in reading the at least one related data such that the target data are unable to be reconstructed and the related data with the reading error reading are user data, then a first mark is marked to a location of the related data with the reading error, and if the target data to be reconstructed is user data, then a location of the target data is marked with a second mark; and, a step of check data updating, wherein the user data in the at least one related data without any mark are used to re-compute new check data to update original check data.

According to another feature of the present invention, a method for handling bad storage device data is provided, and it is used in data writing to storage device of storage system when new data are to be written and to re-compute a new check data is needed. The method includes the following steps: a marking step, wherein if there is a reading error in reading at least one related data such that the new check data are unable to regenerate, and if the at least one related data are user data and the reading error is caused by a media error, then a first mark is marked at the location of the at least one related data, and if the at least one related data are user data and the reading error is caused by a storage device failure, then a second mark is marked at the location of the at least one related data; and, a step of updating check data, wherein the user data in the at least one related data without any mark along with the new data are used to re-compute new check data to update original check data; wherein if the location of the new data have marked when writing the new data, then the mark is deleted.

According to yet another feature of the present invention, the disclosed storage system comprises: a requesting application-end; a controller coupled to the requesting application-end; a storage device array coupled to the controller and having a plurality of storage devices; and at least one bad data block table to record a first mark and a second mark. The first mark is used to mark the location of data that are temporarily unreadable. The second mark is used to mark the location of data that are lost and unable to be regenerated. After marking the first and second marks, new check data are generated in such a way that the marked data are not protected by the new check data.

DETAILED DESCRIPTION OF THE PREFERRED EMBODIMENT

The disclosed storage system and method for handling bad storage device data therefor of the present invention can be used for data processing of the redundant storage devices when the storage system is in the degraded mode together with a media error occurred, or when in data writing, there is a reading abnormality in the storage devices which leads to failure of regeneration of new check data. The storage devices can be tapes, disk drives, memories, optical storage media, or other storage devices which have equivalent function. Suppose in the degraded mode of RAID 1, 3, 4, and 5 a first storage device has failed to read data. If a second storage device also fails to read data at this time, then the data in the first storage device cannot be rebuilt. However, in RAID 6, it is possible to rebuild data even if there are more storage devices failing to read data at the same time. Therefore, the present invention provides an "unprotected" mark and/or a "bad-data" mark for managing data. Consequently, data without any mark can be better protected. In particular, when data are marked with the "unprotected" mark, it means that the data temporarily cannot be read, but could possibly be successfully read at the next try and if the data can be successfully read, then they are still valid data. When data are marked with the "bad" mark, then it means that the data have been lost. The location of the data might be readable, but the data are invalid data. Besides, the present invention re-computes new check data after marking a mark on data. The computation of new check data does not include the data marked with "bad" or "unprotected". That is, the check data do not protect data marked with "bad" or "unprotected".

Figure 4:
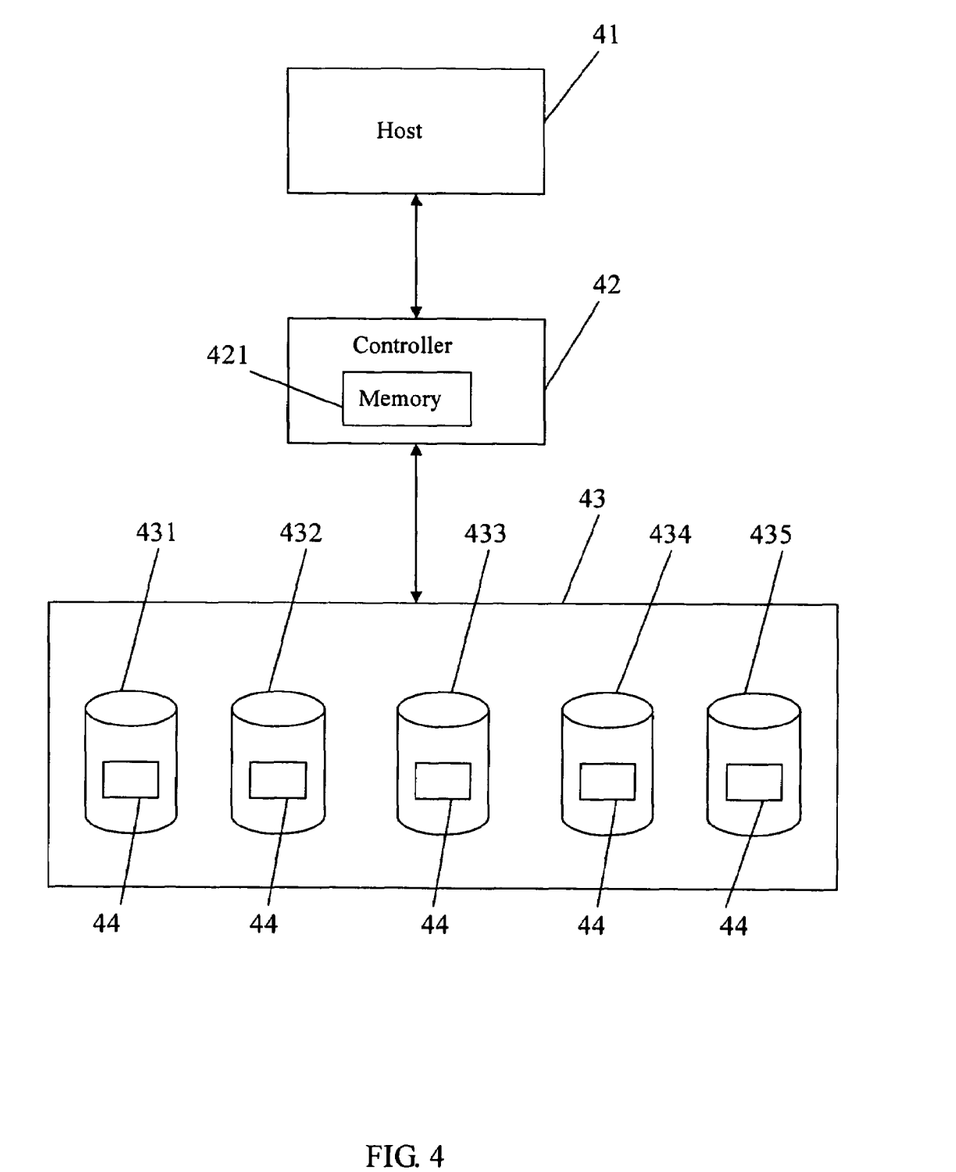
FIG. 4 is a schematic view of the storage system according to a preferred embodiment of the present invention.

FIG. 4 shows the storage system according to a preferred embodiment of the present invention. It comprises a host 41, a controller 42, and a physical storage device array 43. The physical storage device array 43 has a plurality of physical disk drives 431, 432, 433, 434, 435 coupled to either the same channel (or bus interface) or different channels.

In the present embodiment, a bad data block table for recording locations of marked data is provided, and each redundant array of inexpensive/independent disks (RAID)

comprising a plurality of storage devices (e.g., disk drives, memories, and tapes) has a bad data block table. The RAID can be of RAID 1, RAID 3, RAID 4, RAID 5, RAID 6, or some other RAID levels (configurations).

As shown in FIG. 4, the disk drives 431, 432, 433, 434, 435 all have the bad data block table 44 stored therein, so that the bad data block table 44 always exists even if at least one disk drive fails, and that the bad data block table 44 does not disappear due to the failure of the controller 42, either. In another embodiment, the bad data block table 44 can be stored in a non-volatile storage unit. The non-volatile storage unit can be located inside or outside the controller 42. Here, the non-volatile storage unit can be a flash memory, a magnetic random access memory (MRAM), a ferro electronic RAM (FRAM), a tape, or a disk drive. How to use the bad data block table 44 to achieve bad data management is described as follows.

Figure 5:
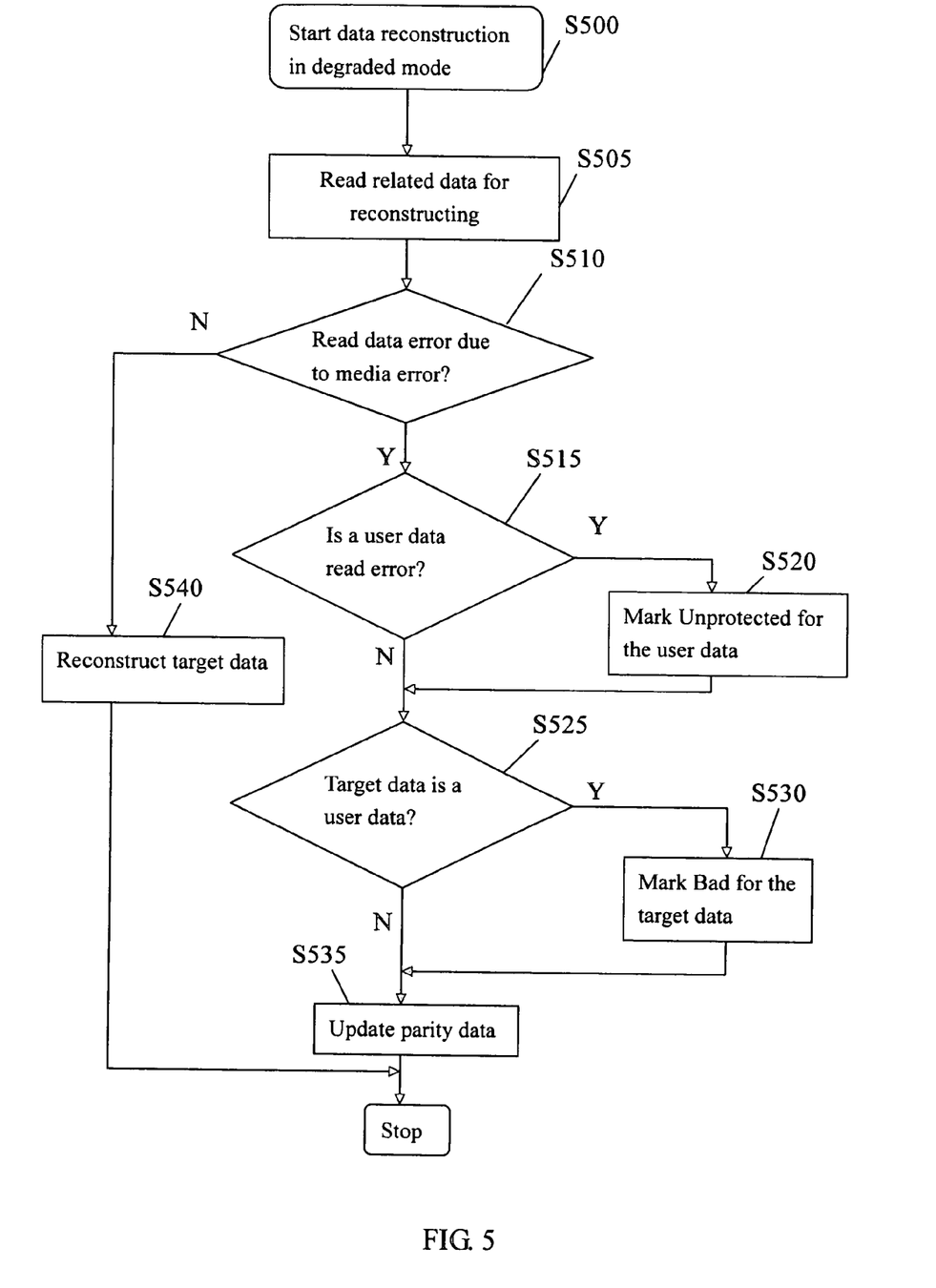
FIG. 5 is an operation flowchart of a preferred embodiment of the present invention.

FIG. 5 shows the operation flowchart of a preferred embodiment of the present invention. Please refer to FIGS. 4 and 6 as well for the associated description. In the present embodiment, it uses RAID 4 as an example. When one of the disk drives in the physical storage device array 43 fails and needs to be rebuilt, step S500 starts. In the present embodiment, the disk drive 432 in FIG. 6 fails and needs to be rebuilt. When reconstructing the data D151, their related data (including the user data D141, D161, D171 and the parity data P4) are read (step S505), and the related data are checked whether they have reading errors because of a media error (step S510). If the related data are all read successfully, then an XOR operation is performed on them to reconstruct the data D151 (step S540).

Figure 6:
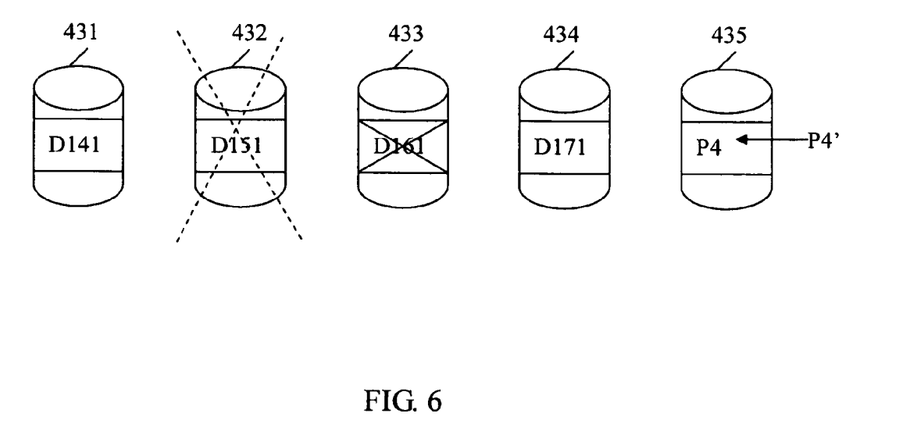
FIG. 6 is a schematic view of a preferred embodiment of the present invention when the data to be rebuilt is user data.

If a reading error occurs due to a media error while reading the related data, then the system determines whether the data with reading error belong to user data (step S515). If the data with reading error (e.g., the data D161) belong to user data, then the location of the data is marked with the "unprotected" mark. That is, the location of the data D161 is marked with "unprotected" in the bad data block table 44. If the data with reading error do not belong to user data, or after step S520 performs, the system keeps on determining whether the data to be reconstructed (called the target data) belong to user data (step S525). If the target data belong to user data (in the present embodiment, the target data D151 are user data) but cannot be reconstructed, then the target data will be lost. Therefore, the location of the data is marked with the "bad" mark in the bad data block table 44 (step S530).

If the target data D151 are not user data, or after step S530 performs, the data without any mark are performed with an XOR operation to obtain new parity data, and the parity data will then be updated (by overwriting the old parity data with the new parity data) (step S535). In the present embodiment, the parity data are the check data.

In the present embodiment, the location of the target data D151 and the location of the data with reading error D161 are marked with "bad" mark and "unprotected" mark, respectively. Therefore, when updating the parity data, only the user data D141, D171 are read for performing the XOR operation. The new parity data $P4'=D141 \oplus D171$. This ensures the consistency in the user data D141, D171 and the new parity data P4', thereby protecting the data D141, D171. As such, in later data access, if one of the user data D141, D171 and the new parity data P4' have an error and cannot be accessed, then they can be regenerated by the XOR operation.

In the above-mentioned embodiments, each block of data can comprise one or more data sector. Meanwhile, the "unprotected" mark and the "bad data" mark can be processed according to a data sector. Of course, although the above-mentioned embodiments use RAID 4 as an example, they can be applied to RAID 1, 3, 5, 6 and their extensions and combinations. However, when applying to RAID 6, more errors are tolerable due to having more check data. Therefore, the present invention is still applicable if data cannot be reconstructed because of the reading error(s) in the storage device(s) when reconstructing the data.

Figure 7A:
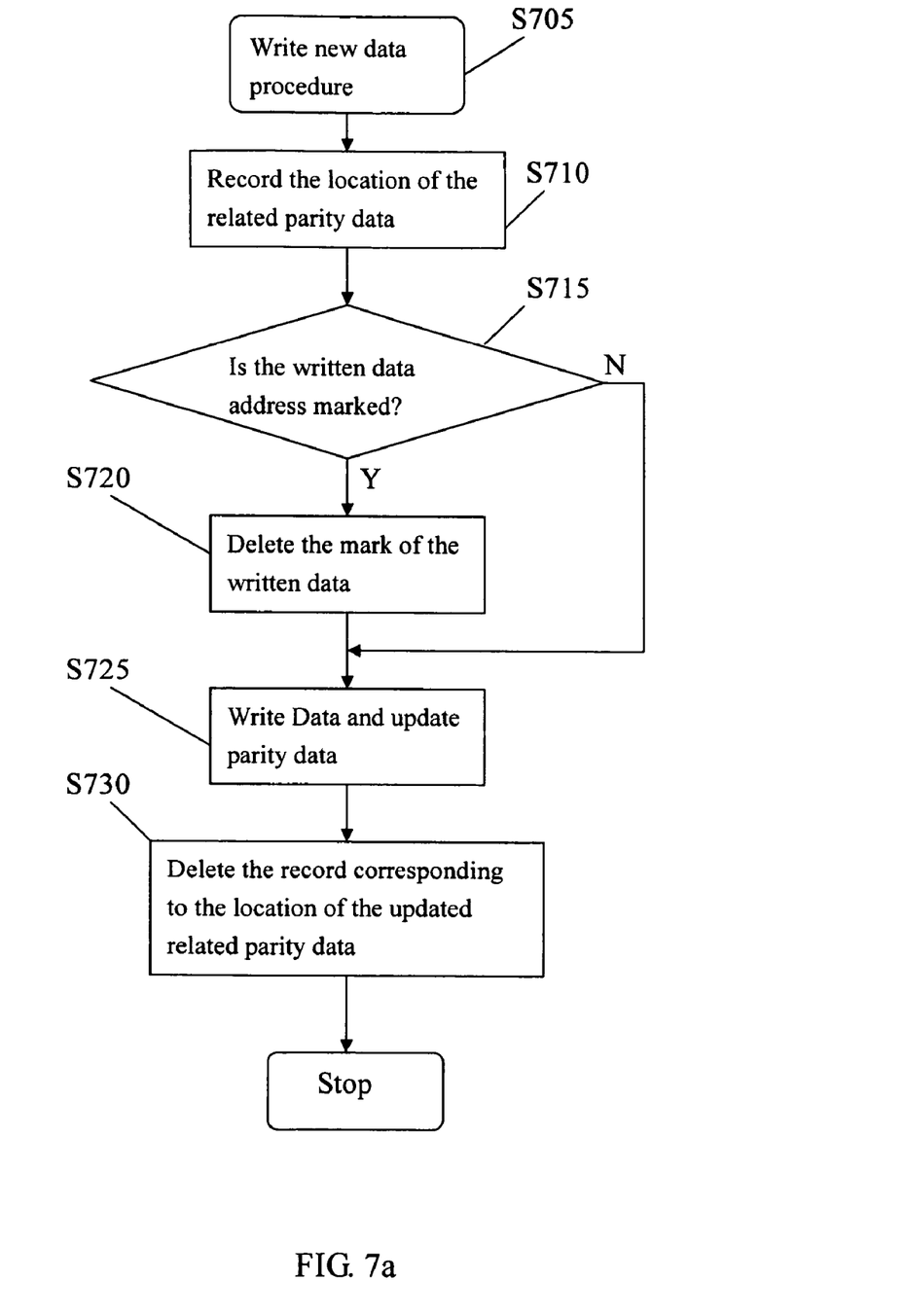
FIG. 7a is a flowchart of data writing according to a preferred embodiment of the present invention.

FIG. 7a shows the flowchart of data writing of a preferred embodiment of the present invention. Please also refer to the system of FIG. 4 for the associated description. When writing new data (step S705), the controller 42 first computes new parity data related to the data to be written and records the location in a non-volatile memory (not shown) of the controller 42. This avoids incomplete writing due to power broken down. The data can be recovered using the foregoing calculated new parity data and the record of the writing location (step S710). Afterwards, the controller 42 uses the bad data block table to determine whether the location of the data to be written is marked with any mark (step S715). If the location is marked with a mark, then the mark is deleted first (step S720) and then both the new data and the new parity data are written (step S725). If the location of the data to be written is not marked with any mark, then the new data and the new parity data are written directly (step S725). After completing the above-mentioned data writing operation, the controller 42 deletes the previously recorded location of the data to be written (step S730) and returns a writing complete message to the requesting application-end (not shown) that can be a device or an application software afterwards.

Figure 7B:
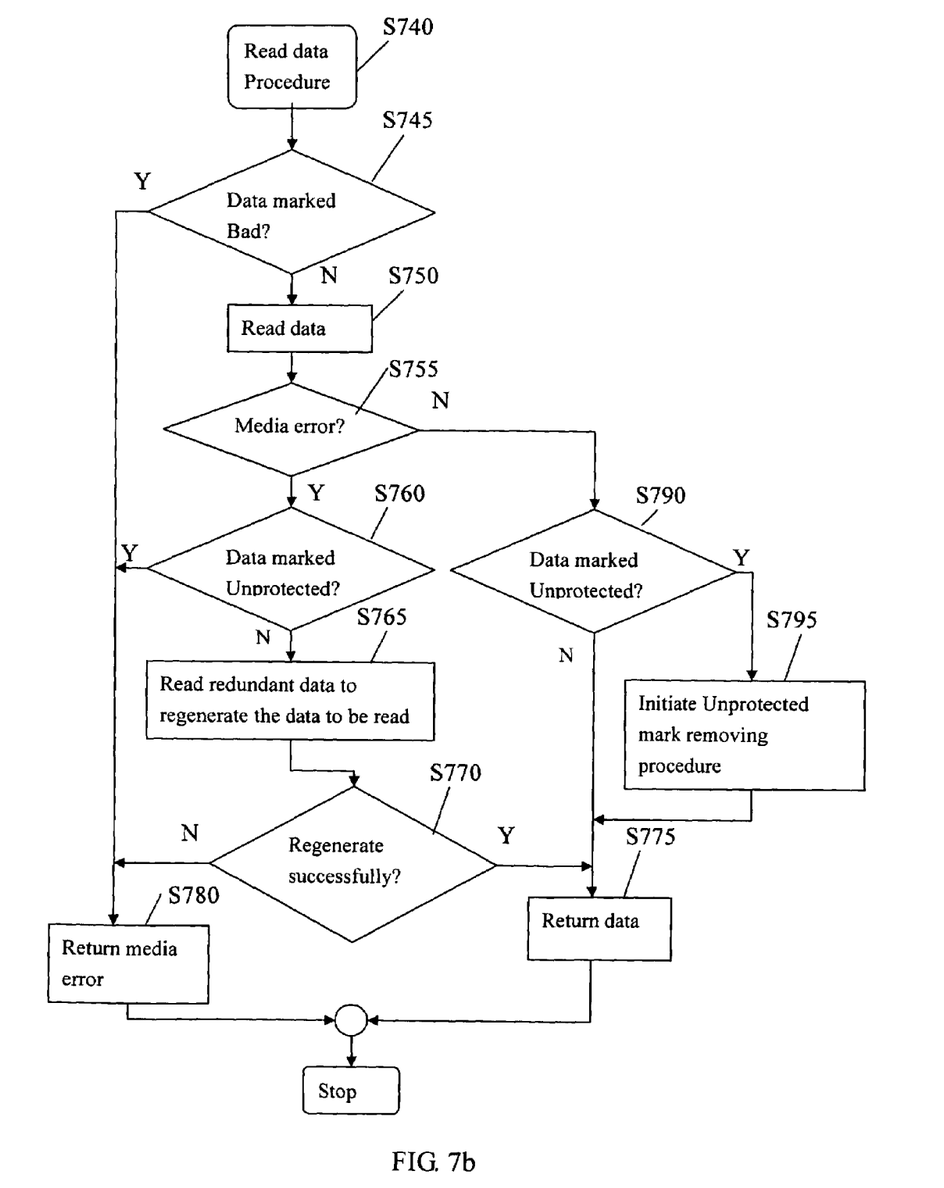
FIG. 7b is a flowchart of data reading according to a preferred embodiment of the present invention.

FIG. 7b shows the flowchart of data reading of the preferred embodiment of the present invention. Please also refer to the system of FIG. 4 for the associated description. When reading data (step S740), the controller 42 first determines whether the location of the data to be read is marked with a "bad" mark (step S745). If the location is marked with "bad", then a media error message is returned to the requesting application-end (e.g. the host 41) (step S780). If the location is not marked with "bad", then the data are read (step S750). When reading the data, they are also determined that whether there is any media error (step S755).

If a media error occurs while reading the data, then they are determined that whether the location of the data being read is marked with "unprotected" (step S760). If the location is marked with "unprotected", then it means that the data being read are not protected by a parity data. Therefore, the data cannot be regenerated through reading other related data and a media error message is returned to the requesting application-end (step S780). If the location is not marked with "unprotected", then the controller 42 regenerates the data being read through reading other related data (step S765).

When regenerating the data, it is possible that the regenerating could fail because one redundant data might not be read. Therefore, after performing the data regeneration, the controller 42 determines whether the data are successfully regenerated (step S770). If they are successfully regenerated, then the regenerated to-be-read data are returned to the requesting application-end (step S775). Otherwise, a media error message is returned to the requesting application-end (step S780).

In step S755, if no media error occurs while reading the data, then they are determined that whether the location of the data being read is marked with "unprotected" (step S790). If the location is not marked with "unprotected", then the data are returned to the requesting application-end (step S775). If it is marked with "unprotected", then procedure of deleting the "unprotected" mark can be initiated (step S795) and the read data are returned (step S775). The procedure of deleting the unprotected mark is detailed with reference to FIGS. 7c and 8.

Figure 8:
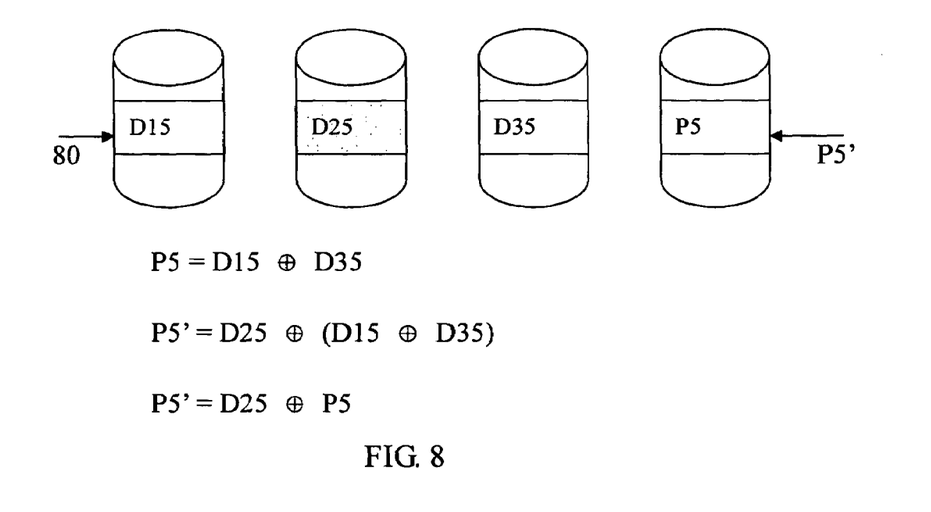
FIG. 8 is a schematic view of removing unprotected marks according to a preferred embodiment of the present invention.

In FIG. 8, user data D15, D25, D35 and a parity data P5 are located on the same stripe 80. The user data D25 are the data to be read and are marked with "unprotected". Since the user data D25 are marked, the parity data P5 are obtained by computing an XOR operation on the user data D15, D35.

Figure 7C:
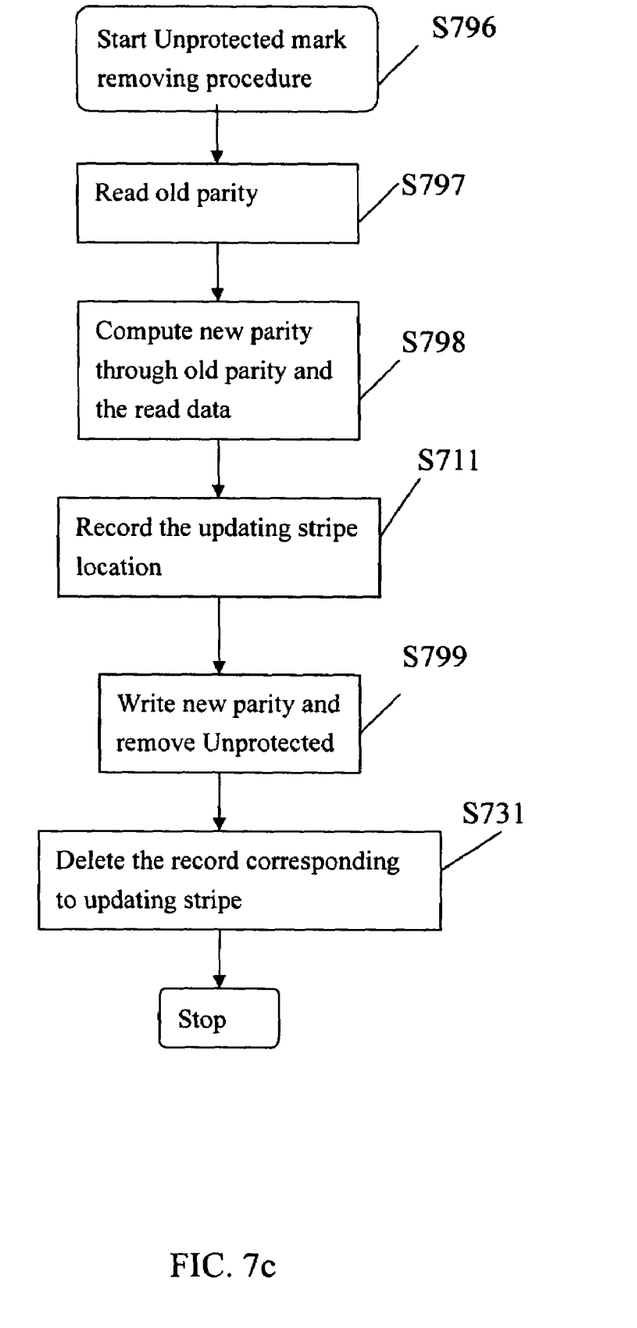
FIG. 7c is a flowchart of removing unprotected marks according to a preferred embodiment of the present invention.

In FIG. 7c, when starting the procedure of deleting the "unprotected" mark (step S796), since the data D25 are already successfully read, new parity data P5' on the same stripe of the data D25 have to be re-computed in order to protect the data D15, D25, D35. First, the parity data P5 on the same stripe of the read data D25 are read. The parity data P5 can be read from a cache memory (not shown) of the controller 42 or the related disk drive (step S797). Afterwards, the new parity data P5' are computed using the read data D25 and the old parity data P5 (step S798). However, in order to avoid incomplete writing of the new parity data P5' due to power failure, the controller 42 records the location of the stripe where the new parity data are located in its non-volatile memory (not shown) (step S711). Afterwards, the controller 42 writes the new parity data P5' and deletes the "unprotected" mark related to the data D25 on the bad data block table (step S799). After that, the controller 42 deletes the location of the stripe of the previously recorded new parity data P5' (step S731).

Figure 9:
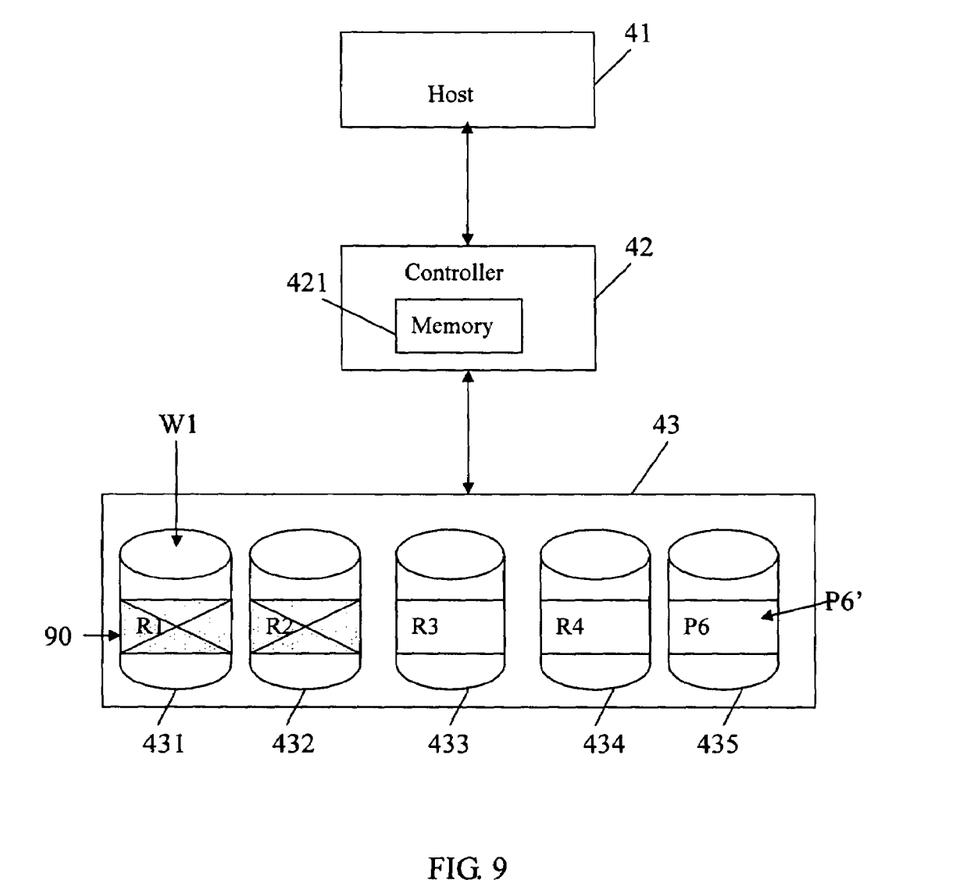
FIG. 9 is a schematic view showing that a storage device reading abnormality occurs during data writing so that new check data cannot be generated of the present invention.

FIG. 9 shows that new check data cannot be generated because of a reading abnormality in the storage devices during data writing. A host 41, a controller 42, and a physical storage device array 43 are comprised in FIG. 9. The controller 42 has memory 421. The physical storage device array 43 has disk drives 431, 432, 433, 434, and 435. The disk drives 431, 432, 433, 434, and 435 have respectively user data R1, R2, R3, R4, and parity data P6 located on the same stripe 90. The parity data P6 are obtained by performing an XOR operation on the user data R1, R2, R3, and R4. That is, P6=R1⊕R2⊕R3⊕R4.

Suppose the host 41 writes data to be written W1 into the disk drive 431 via the controller 42. If both the disk drives 431 and 432 have media errors (e.g., an reading error of the user data R1 in the disk drive 431 and also another reading error of the user data R2 in the disk drive 432), then a data protection mechanism has to be performed. In the present embodiment, since the disk drive 431 has a media error, the data to be written W1 can directly overwrite the old user data R1 or are written to some other location through a reassigning mechanism while writing in the disk drive.

When writing the data W1 to be written, the parity data have to be re-computed, too. However, the user data R2 in the disk drive 432 cannot be read; therefore the new parity data can not be reconstructed. So, the present invention mark a "Unprotected" mark to the location of the user data R2, and it means that the user data R2 is not included in the calculation of the new parity data. At this moment, new parity data P6' are generated by an XOR operation on the data W1 and the user data R3, R4. That is, P6'=W1⊕R3⊕R4. In other words, the new parity data P6' only protect the data W1 to be written and the user data R3, R4, but not the marked user data R2. As such, the data protection is sustained. If the user data R2 can be read successfully, the data is still correct, but it is not protected by the parity data P6'. The removal of the "unprotected" mark of the location of the user data R2 and the subsequent processing are described in the above-mentioned embodiment and, therefore, they are not repeated here.

In other embodiments, it is possible that the disk drive 432 has already failed and the storage system is in the degraded mode. At this time, if the disk drive 431 also has a media error when reading the user data R1 before writing the data W1, then the user data R2 will be lost and cannot be regenerated. Therefore, the location of the user data R2 is marked with the "bad" mark. Likewise, the new parity data P6' are still generated by the XOR operation on the data W1 and the user data R3, R4.

Under certain situations, it is possible that the disk drive 431 fails and another disk drive 432 has a media error. At this time, although the data W1 to be written are not immediately written due to the failure of the disk drive 431, the new parity data P6' are still updated. That is, P6'=W1'P6⊕R3⊕R4. Since the disk drive 432 has a media error, the location of the user data R2 is marked with the "unprotected" mark. The new parity data P6' therefore do not protect the user data R2. Afterwards, another disk drive is used to substitute the failed disk drive 431. Then the data W1 to be written can be generated by reading the protected user data R3, R4 and the new parity data P6' and performing an XOR operation on those data. That is, W1=P6'⊕R3⊕R4. Once the data W1 are regenerated, they are written into the substituting disk drive. Likewise, this embodiment can be applied to RAID 1, 3, 5, 6 and their extensions and combinations.

According to the above description, the present invention provides "unprotected" marking and/or "bad" marking to manage data. The "unprotected" mark is used to mark the location of user data in a storage device that a media error occurs and cannot be used to regenerate check data. When the data of a location marked with an "unprotected" mark are successfully read, they will still be valid and the "unprotected" mark can be deleted so that the data can be sustained even after a media error occurred. In addition, the "bad" mark is used to mark the location of a user data in a failed storage device. In the degraded mode, the failed storage device is the storage device to be rebuilt, while in a situation that data are being written and a storage device has a reading error, the failed storage device is a non-target storage device that the data are not written. Here the "bad data" mark means that the data might be readable, but their values are invalid. Therefore, the host receives a data error message when the data are read. These above-mentioned means provide better data protection and higher system reliability.

Above-mentioned embodiments are exemplified simply for the convenience of explanation of the present invention, while the claimed patent right of the present invention should be in accord with the appended claims and not limited to above-mentioned embodiments.

What is claimed is:

1. A method for handling bad storage device data used in a storage system of a degraded mode in which target data need to be reconstructed, the method comprising:
   a related data reading step, wherein at least one data related to the target data are read;
   a marking step, wherein if there is a reading error in reading the at least one related data such that the target data are unable to be reconstructed and the related data with the reading error are user data, then a first mark is marked to a location of the related data with the reading error, and if the target data to be reconstructed is user data, then a location of the target data is marked with a second mark also; and
   a check data updating step, wherein the user data in the at least one related data without any mark are used to re-compute new check data to update original check data.

2. The method of claim 1, wherein when the related data marked with the first mark are read again and if they are read successfully, then the first mark is deleted and after the deletion of the first mark, the check data related to the data with the first mark deleted are updated.

3. The method of claim 1, wherein when writing new data at the marked location, the mark of the data location is deleted, the new data are written, and the check data related to the new data are updated.

4. The method of claim 1, wherein before writing new data, the location of a stripe where the new data are located is recorded, and after writing the new data and updating the related check data, the record of the location where the new data are located is deleted.

5. The method of claim 1, wherein if data are read and the location of the data has been marked with a second mark, then an error message is returned to an requesting application-end.

6. The method of claim 1, wherein if there is a reading error when reading data and the location of the data is marked with a first mark, then an error message is returned to an requesting application-end.

7. The method of claim 1, wherein if there is a reading error when reading data and the data is not marked with any mark, then the data are regenerated through reading other related data.

8. A method for handling bad storage device data, used in data writing to storage device of storage system when new data are to be written and to re-compute new check data is needed, the method comprising:

a marking step, wherein if there is a reading error in reading at least one related data such that the new check data are unable to regenerate, and if the at least one related data are user data and the reading error is caused by a media error, then a first mark is marked at the location of the at least one related data, and if the at least one related data are user data and the reading error is caused by a storage device failure, then a second mark is marked at the location of the at least one related data; and a check data updating step, wherein the user data in the at least one related data without any mark along with the new data are used to re-compute new check data to update original check data; wherein if the location of the new data have marked when writing the new data, then the mark is deleted.

9. The method of claim 8, wherein when the related data marked with the first mark are read again and if they are read successfully, then the first mark is deleted and after the deletion of the first mark, the check data related to the first mark-deleted data are updated.

10. The method of claim 8, wherein if data is read and the location of the data has been marked with a second mark, then an error message is returned to an requesting application-end.

11. The method of claim 8, wherein if there is a reading error when reading data and the location of the data is marked with a first mark, then an error message is returned to an requesting application-end.

12. The method of claim 8, wherein if there is a reading error when reading data and the data are not marked with any mark, then the data are regenerated through reading other related data.

13. A storage system, comprising:
an requesting application-end;
a controller coupled to the requesting application-end;
a storage device array coupled to the controller and having a plurality of storage devices; and
at least one bad data block table to record a first mark and a second mark;
wherein the first mark is used to mark the location of data that are temporarily unreadable, the second mark is used to mark the location of data that are lost and unable to be regenerated, and after marking the first and the second marks, new check data are generated in such a way that the marked data are not protected by the new check data.

14. The storage system of claim 13, wherein the bad data block table is stored in each of the storage devices.

15. The storage system of claim 13, wherein the bad data block table is stored in a non-volatile storage unit.

16. The storage system of claim 13, wherein when the related data marked with the first mark are read again and if they are accessed successfully, then the first mark is deleted and after the deletion of the first mark, the check data related to the first mark-deleted data are updated.

17. The storage system of claim 13, wherein if data are read and the location of the data has been marked with a second mark, then an error message is returned to the requesting application-end.

18. The storage system of claim 13, wherein if there is a reading error when reading data and the data are not marked with any mark, then the data are regenerated through reading other related data.

19. The storage system of claim 13, wherein when writing new data at a marked location, then the mark is deleted, the new data are written, and the check data related to the new data are updated.

20. The storage system of claim 13, wherein if there is a reading error when reading data and the location of the data is marked with a first mark, then an error message is returned to the requesting application-end.

* * * * *